United States Patent [19]

Kobayashi et al.

[11] 4,059,382
[45] Nov. 22, 1977

[54] APPARATUS FOR PROCESSING TOP ENDS OF ROD-LIKE RESIN ARTICLES

[75] Inventors: Hisawo Kobayashi, Funabashi; Takehiko Watanabe, Saitama, both of Japan

[73] Assignee: Kao Soap Co., Ltd., Tokyo, Japan

[21] Appl. No.: 781,169

[22] Filed: Mar. 25, 1977

[30] Foreign Application Priority Data

Sept. 14, 1976  Japan .......................... 51-124095[U]

[51] Int. Cl.² ............................................ B29C 17/00
[52] U.S. Cl. .................................................. 425/446
[58] Field of Search ....................................... 425/446

[56] References Cited
U.S. PATENT DOCUMENTS 3,492,689  2/1970  Clirgivin .............................. 425/446

Primary Examiner—J. Howard Flint, Jr.
Attorney, Agent, or Firm—Blanchard, Flynn, Thiel, Boutell & Tanis

[57] ABSTRACT

An apparatus for treating the ends of elongated rod-like synthetic resin articles comprising a rotatable disk having circumferentially spaced slits in its periphery for receiving the articles at a feed station, moving them through a treating station and discharging them at a discharge station. A tool is located at said treating station for treating corresponding ends of said articles.

4 Claims, 2 Drawing Figures

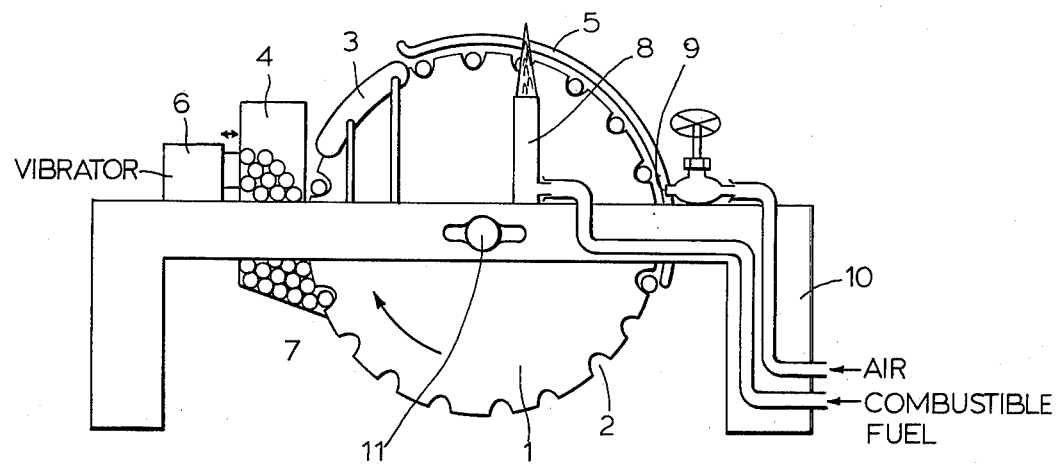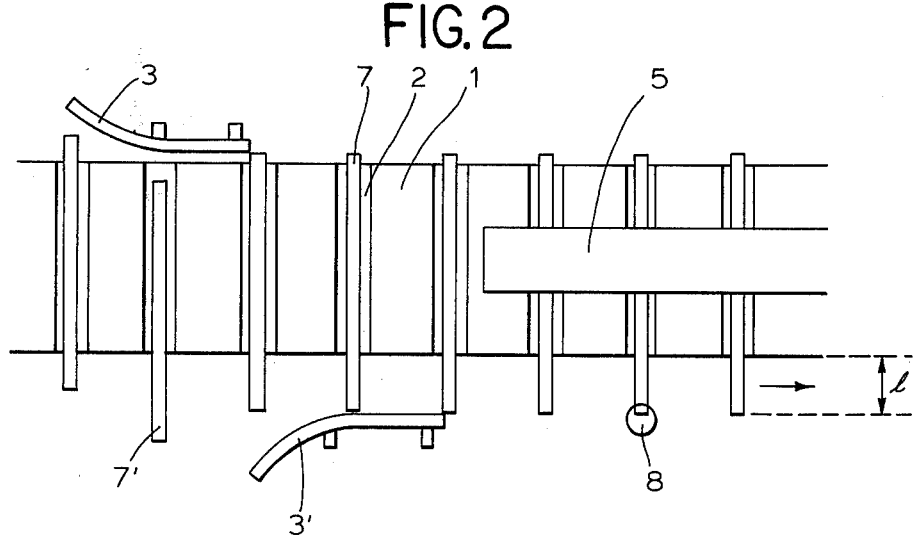

APPARATUS FOR PROCESSING TOP ENDS OF ROD-LIKE RESIN ARTICLES

BACKGROUND OF THE INVENTION

1. Field of the Invention

This invention relates to an apparatus for treating the ends of rod-like resin articles, for example, rounding or sharpening such ends or applying another substance to such ends.

2. Description of the Prior Art

Bristles of hair brushes or the like are now made of synthetic resins. When relatively thick bristles are used, long resin rods are formed by molding and they are cut into prescribed lengths in order to form bristles. If the cut faces of such bristles are not rounded, there is a risk that the user's head skin will be hurt by these bristles. However, there has not been developed a fully satisfactory apparatus for rounding the ends of such rod-like resin articles. Further, although it is often required to coat or apply a medicinal composition or the like to the ends of these rod-like resin articles, there has not been developed an apparatus for performing such processing at high efficiency.

SUMMARY OF THE INVENTION

It is therefore a primary object of the present invention to provide an apparatus for treating the ends of rod-like resin articles at high efficiency.

In accordance with the present invention, there is provided an apparatus for treating corresponding ends of elongated rod-like resin articles which comprises a cylindrical rotary disc or table having a plurality of circumferentially spaced-apart slits on the periphery thereof, each slit being adapted to receive one rod-like resin article therein, and a treating tool disposed for treating said ends of the rod-like resin articles as they move with the disc or table.

The present invention will be described with reference to an embodiment for rounding the ends of rod-like resin articles, as illustrated in the accompanying drawing.

BRIEF DESCRIPTION OF THE DRAWING

FIG. 1 is a schematic front view of an apparatus according to the invention.

FIG. 2 is a developed plan view of the main parts of the apparatus.

As shown in FIG. 1, the apparatus of the present invention comprises a cylindrical rotary member in the form of a table or disc having on the peripheral surface thereof a plurality of circumferentially spaced slits 2 formed so that each slit 2 can receive one rod-like resin article 7. The rotary member 1 is supported by a shaft 11 for rotation about a horizontal axis. A hopper is provided for storing the rod-like resin articles 7 and supplying them to the rotary member 1. A vibrator 6 is connected to the hopper 4 to assure proper feeding of the articles 7 to the member 1. A gas burner 8 is disposed for directing a flame against one end of the rod-like resin articles 7, as said articles move with the table 1, in order to melt and round off the end of said resin article. An air nozzle 9 is positioned for cooling the rod-like resin articles 7 after they have been rounded off. Positioning devices such as cams 3 are provided for positioning the ends of the rod-like resin articles 7 within the slits. A cover 5 is provided for holding the rod-like resin articles 7 in the slits at least during the treating steps.

The lower side wall of the hopper 4 is open and is in close sliding contact with the circumference of the rotary member 1. The rod-like resin articles 7 are moved into the slits one by one and are lifted up by the slits 2 as the member 1 rotates. Cams 3 and 3' are arranged on both sides of the rotary member 1 in the upper portion thereof for positioning the resin articles in the slits so that corresponding one ends of said resin articles project a fixed distance beyond the end surface of the rotary member. The cover 5 is fixed above the upper portion of the path of travel of the rotary member 1 for retaining the resin articles in the slits.

The gas burner 8 and the air nozzle 9 are provided on one side of the rotary member 1 in the portion of the path of travel of the slits that is covered by the cover 5. The burner 8 and nozzle 9 are mounted on a support 10. The cover 5 is a fixed arcuate member that is positioned a small distance radially outwardly of and extends along the circumferential face of the cylindrical rotary member 1 so that the rod-like resin articles 7 do not move out from the slits 2 even when they are contacted by the flame or the air blast. In the embodiment shown in FIG. 1, the uppermost end of the cover 5 is located in trailing relationship to the cams 3 and 3', but in general, it is preferred that the cover 5 be extended up to the leading ends of the cams 3 and 3'. As shown in FIG. 2, the cams 3 and 3' are a pair of oppositely inclined plates arranged so that the leading side, with respect to the advancing direction of the cylindrical rotary member 1, of each inclined plate is spaced from the rotary member 1 and the trailing end thereof is positioned close to the rotary member 1 at a prescribed position. The end 7' to be treated of the rod-like resin article 7 contacts the trailing end of the guide 3' and is positioned thereby in position for contact by the treating tool.

When the rotary member 1 is rotated in the direction of the arrow in FIG. 1, the rod-like resin articles 7 stored in the hopper 4 are moved one by one into the slits 2 formed on the periphery of the rotary member 1. In order to arrange the rod-like resin articles 7 in parallel to the slits 2, it is preferred that a vibrator 6 be attached to the hopper 4. The rod-like resin articles 7 thus received in the slits 2 are aligned by the cams 3 and 3' so that each rod-like resin article 7 projects from the end surface of the rotary member 1 by a length $l$ as shown in FIG. 2. When the rod-like resin articles 7 are thus arranged at prescribed positions and are moved upwardly by rotation of the rotary member 1, they are retained in the slits by the cover 5 and the projecting ends of the rod-like resin articles 7 are melted and are rounded by the flame from the gas burner 8 and then are cooled by air or the like cooling jet from the nozzle 9. Then, the treated rod-like resin articles 7 are discharged from the member 1 and are fed to the subsequent step.

If it is desired to treat both ends of the rod-like resin article 7, treatment tools such as gas burners 8 are disposed on both sides of the rotary member 1. When it is desired to use two rod-like resin articles simultaneously during a subsequent step, two processing apparatuses, each having the above structure, are disposed symmetrically and the processed rod-like resin articles are joined in one discharge zone.

When a treatment different from the end-rounding treatment is to be carried out, an appropriate treatment tool is used in place of the gas burner 8. For example, when the end portions of rod-like resin articles are to be cut off so as to have their ends inclined in a certain direction, a cutter blade is employed as the processing tool, and when a medicinal composition or the like is to be applied on the ends of rod-like resin articles, a coating roller or brush is used as the processing tool.

As will be apparent from the foregoing description, according to the processing apparatus of the present invention, rod-like resin articles can be processed one by one continuously and hence, the processing can be accomplished with a very high efficiency.

We claim:

1. An apparatus for processing the ends of rod-like resin articles which comprises a cylindrical rotary member having slits on the peripheral surface thereof, each slit being adapted to contain one rod-like resin article therein, and a processing tool disposed in the path of travel of the rod-like resin articles for treating the end thereof.

2. An apparatus as set forth in claim 1 wherein the slits are equidistantly formed on the periphery of the cylindrical rotary member and the slits extend parallel to the axis of rotation of the cylindrical rotary member.

3. An apparatus as set forth in claim 1 wherein the processing tool is a burner.

4. An apparatus according to claim 1 in which said rotary member is a disk mounted for rotation about a horizontal axis, means for feeding said resin articles, one by one, into said slits at a feeding station located on the upwardly moving portion of the direction of travel of the disk, a pair of positioning means positioned above said feeding station and located adjacent the opposite end walls of said disk for engaging the ends of said articles and positioning them in fixed axial positions in said slits, said processing tool comprising a burner positioned adjacent one end wall of said disk in trailing relationship to said positioning means and arranged for directing a jet of burning gas upwardly and substantially in parallel to said one end wall of said disk for contacting ends of said resin articles projecting from said disk, a nozzle located in trailing relationship to said burner for directing cooling fluid against said ends of said resin articles, and an arcuate cover plate located close to, but radially outwardly spaced a small distance from the periphery of said disk for preventing said articles from being removed from said slits, said cover plate extending at least from adjacent said nozzle to adjacent said positioning means.

* * * * *